United States Patent [19]
Herrema

[11] Patent Number: 5,941,018
[45] Date of Patent: Aug. 24, 1999

[54] LAWN EDGING

[76] Inventor: Robert T. Herrema, 1864 Parker Dr., Wayland, Mich. 49348

[21] Appl. No.: 08/907,757

[22] Filed: Aug. 8, 1997

[51] Int. Cl.⁶ ........................................................ A01G 1/00
[52] U.S. Cl. .................................................................. 47/33
[58] Field of Search ................................ 47/33; 404/7, 8; 52/102; 256/21, 24

[56] References Cited

U.S. PATENT DOCUMENTS

| | | | |
|---|---|---|---|
| 122,171 | 12/1871 | Holmes | 256/21 |
| D. 250,744 | 1/1979 | Martinelli . | |
| D. 257,064 | 9/1980 | Kobee . | |
| D. 292,060 | 9/1987 | Kerber . | |
| 425,890 | 4/1890 | Landis . | |
| 537,036 | 4/1895 | Hayes | 256/21 |
| 557,030 | 3/1896 | Schaefer . | |
| 879,268 | 2/1908 | Jamieson | 256/21 |
| 931,554 | 8/1909 | Andersen | 256/21 |
| 1,727,779 | 9/1929 | Marengo . | |
| 1,843,108 | 2/1932 | Clayden . | |
| 2,094,519 | 9/1937 | Ballard . | |
| 2,227,553 | 1/1941 | Paque | 256/21 |
| 2,295,271 | 9/1942 | Schuck | 256/24 |
| 2,721,633 | 10/1955 | Keelor . | |
| 2,769,277 | 11/1956 | Keelor . | |
| 2,809,809 | 10/1957 | Johnston . | |
| 2,821,809 | 2/1958 | Collieer et al. . | |
| 2,842,344 | 7/1958 | Todd . | |
| 2,987,299 | 6/1961 | Kneen | 256/24 |
| 3,037,593 | 6/1962 | Webster | 52/102 |
| 3,332,197 | 7/1967 | Hinkle . | |
| 3,370,391 | 2/1968 | Dupuis et al. . | |
| 3,373,668 | 3/1968 | Moore et al. . | |
| 3,387,786 | 6/1968 | Rynberk . | |
| 3,415,013 | 12/1968 | Galbraith . | |
| 3,472,133 | 10/1969 | Ziehm, Jr. . | |
| 3,484,989 | 12/1969 | Lazinsky . | |
| 3,724,128 | 4/1973 | Tabone . | |
| 3,788,001 | 1/1974 | Balfanz, Jr. . | |
| 3,841,022 | 10/1974 | Thodos . | |
| 3,933,311 | 1/1976 | Lemelson . | |
| 4,191,361 | 3/1980 | Jensen | 256/24 |

(List continued on next page.)

FOREIGN PATENT DOCUMENTS

| | | | |
|---|---|---|---|
| 105437 | 7/1937 | Australia | 47/33 |
| 2048990 | 2/1993 | Canada | 47/33 |
| 523477 | 4/1931 | Germany | 47/33 |
| 10588 | 5/1900 | United Kingdom | 47/33 |
| 215529 | 12/1923 | United Kingdom | 47/33 |
| 252560 | 6/1926 | United Kingdom | 47/33 |
| 399250 | 10/1933 | United Kingdom . | |
| 417724 | 10/1934 | United Kingdom | 47/33 |

OTHER PUBLICATIONS

"American Nurseryman", Jul. 15, 1958, p. 168, Advertisement for Morrison Steel Co.

"Kamb–Stahlblechverarbeitung", Jun. 6, 1977 Advertisement for KAMB–Raseneinfassungen.

*Primary Examiner*—Thomas Price
*Assistant Examiner*—Fredrick T. French, III
*Attorney, Agent, or Firm*—Price, Heneveld, Copper, Dewitt & Litton

[57] ABSTRACT

A landscape edging system includes a horizontally elongate edging strip having opposing sides, a tab projecting from a side of the edging strip, and a vertically elongate stake. The tab includes a first portion which extends away from the side of the edging strip and a second portion which extends substantially in a longitudinal direction of the elongate edging strip in spaced relationship from a vertical plane generally defined by the side of the edging strip from which the tab projects. The elongate stake includes at least one edge portion having a thickness approximately equal to a distance between the vertical plane generally defined by the side of the edging strip from which the tab projects and the portion of the tab which extends in the direction of the elongate edging strip. The system allows opposing sides of the edge portions of the stake to be engaged by and retained between the edging strip and the tab. The arrangement allows greater flexibility in configuring a stake having a high strength for the amount of material being used to form the stake.

11 Claims, 3 Drawing Sheets

U.S. PATENT DOCUMENTS

| | | | |
|---|---|---|---|
| 4,202,145 | 5/1980 | Coulter et al. | 52/102 |
| 4,281,473 | 8/1981 | Emalfarb et al. . | |
| 4,508,319 | 4/1985 | Tappan et al. | 256/21 |
| 4,516,875 | 5/1985 | Turner . | |
| 4,628,632 | 12/1986 | Zwier . | |
| 4,644,685 | 2/1987 | Tisbo et al. . | |
| 4,647,491 | 3/1987 | Ireland et al. . | |
| 4,702,034 | 10/1987 | Ferguson et al. . | |
| 4,747,231 | 5/1988 | Lemay et al. . | |
| 4,823,521 | 4/1989 | Kontz, Jr. . | |
| 5,020,272 | 6/1991 | Herrema et al. . | |
| 5,261,760 | 11/1993 | Castinguay et al. | 404/7 |
| 5,301,461 | 4/1994 | Zwier . | |
| 5,315,780 | 5/1994 | Thomas | 47/33 |

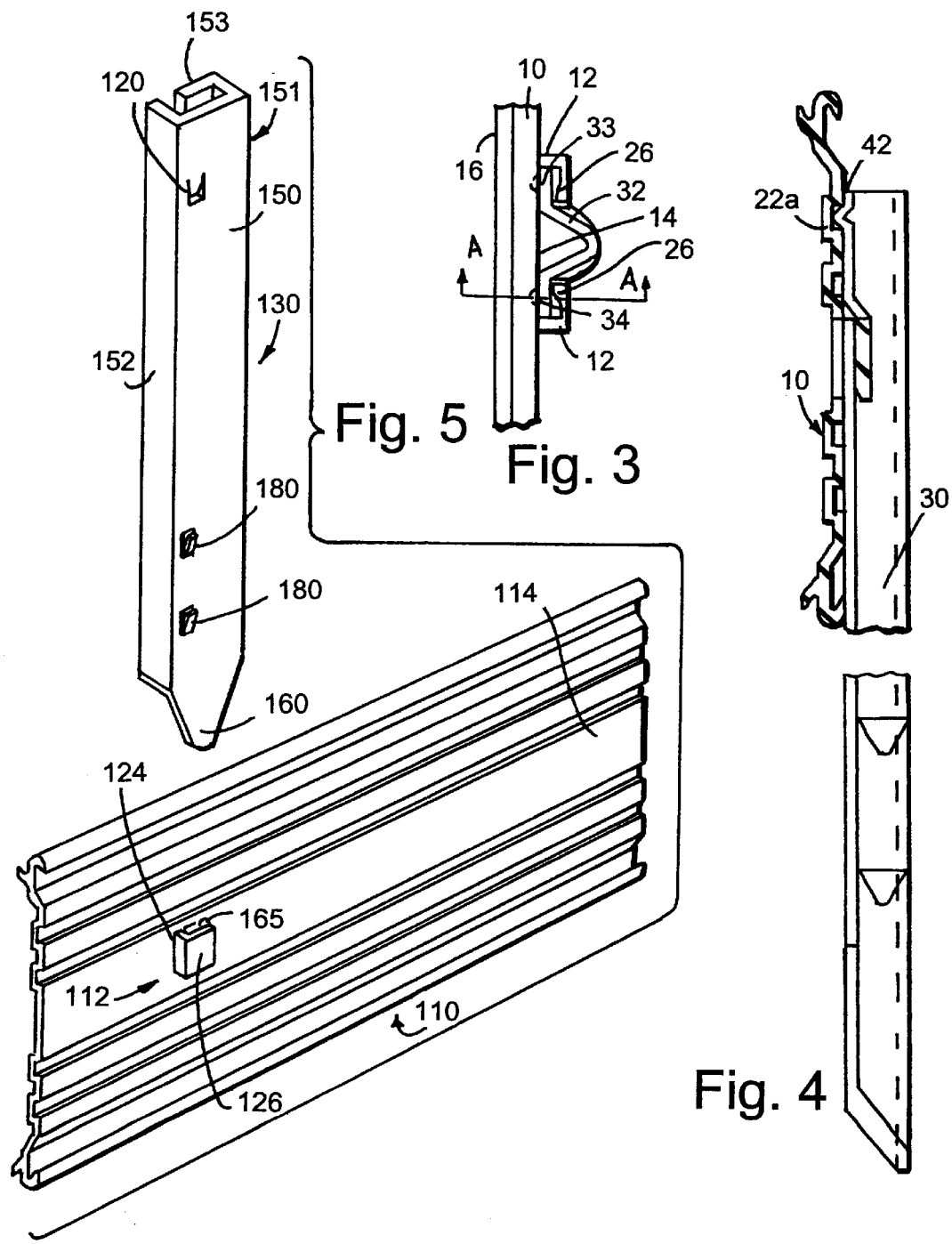

LAWN EDGING

FIELD OF THE INVENTION

This invention relates to landscape edging, and more particularly to a landscape edging system comprising an edging strip and an anchor stake which are adapted to interlockably engage each other.

BACKGROUND OF THE INVENTION

Typically, landscape edging or paving restraint systems of the type including an edging strip and one or more anchor stakes, each of which is configured to interlockably engage the edging strip, have either included stakes with a hook portion which extends upwardly along one side of the edging strip, over the top of the edging strip, and back downwardly along the other side of the edging strip, or have included an edging strip with an anchor strip punched out of the material of the edging strip with opposite longitudinal ends of the strip being integrally connected to the material of the edging strip to form a continuous loop or stirrup through which the anchor stake is inserted. Those landscape edging systems including a stake with a hook portion which loops over the top of the edging strip interrupt the substantially continuous profile of the edging strip and are therefore aesthetically undesirable. Those landscaping edging systems which include an edging strip with an elongated strip punched out of the material of the edging strip to form a continuous loop or stirrup are also undesirable for a plurality of reasons. Because the stakes are generally relatively thin to allow easy penetration into the soil, it is generally desirable to provide longitudinal bends or stiffening ribs to increase the strength of the stake without increasing the amount of material used to form the stake. It is especially desirable to form the stake from metal sheet with the metal sheet being used to form the stakes being bent about a longitudinal axis of the stake to increase the strength, stiffness and rigidity of the stake to make it more resistant to deformation. The longitudinal bends in the stakes formed from metal sheet result in a stake having an overall thickness which is typically many times greater than the thickness of the metal sheet used to form the stake. Likewise, the provision of reinforcing ribs on extruded and molded stakes provides a stake having an overall thickness which is typically many times greater than the minimum or average thickness of the stake measured from one side of the stake to the other side. Although the strength of the stake, especially the resistance of the stake to deformation, is dependent upon the particular cross sectional shape or profile of the stake transverse to the longitudinal axis thereof, in general the greater the ratio of the overall thickness of the stake with respect to the average thickness of the stake, the greater will be the resistance of the stake to deformation. However, the extent to which a stake may be bent or provided with stiffening ribs is practically limited when the stake must be inserted through a ribbon strip punched out of the material of the edging strip. Another disadvantage with edging strip systems including an edging strip in which a ribbon strip is punched out of the material of the edging strip to provide a loop or stirrup through which the stake is inserted is that the ribbon strip creates a large window or gap which is not completely covered by the stake. As a result, grass roots can grow through those portions of the gap or window left by the ribbon strip which are not covered by the stake. This is extremely undesirable, as one of the major uses of edging systems is to prevent grass roots from spreading from a lawn on one side of the edging to a flower bed or other landscape area on the other side of the edging. Because the vertically extending central portion of the stakes must in general engage a central portion of the ribbon strip punched out of the lawn edging strip, it is generally not possible to provide the central portion of the stake with barbs or other features which help prevent the stake from being urged upwardly from the soil. Another disadvantage with lawn edging systems including an edging strip with ribbon strips punched into the material thereof to form a stirrup or loop for inserting an anchor stake is that the ribbon strip, being integrally connected at opposite ends thereof to the edging strip, tends to bow outwardly away from or inwardly toward the edging strip, depending on which direction the edging strip is bent, when the edging strip is bent along its length to conform with the shape of curved landscape areas which are to be separated by the edging. As a result of this deformation of the ribbon strip relative to the edging strip, the distance between the central portion of the ribbon strip and the edging strip increases or decreases, depending on which direction the edging strip is bent, so that the stake is either not adequately engaged by the ribbon strip, or is too tightly engaged by the ribbon strip so as to cause deformation of one or both of the stake and the edging strip or the stake will no longer fit into the gap. A further disadvantage with edging having a ribbon strip punched out of the material of the edging strip for receipt of an anchor stake is that the ribbon strip tends to substantially increase the effective thickness of the edging strips which consequently increases the amount of space needed for shipping and storage of the edging strips.

SUMMARY OF THE INVENTION

The landscape edging system of this invention overcomes the above mentioned problems associated with known edging systems. In particular, the edging system of this invention includes features which allow the anchor stake to be configured, generally as desired, to provide high strength cross-sectional shapes or profiles without being limited by the connecting structure for interlocking the anchor stakes with the edging strips. The connection features of the invention allow the horizontally elongate edging strip to be bent about a vertical axis without significantly affecting the connection between the anchor stakes and the edging strip. A further advantage with the edging strip of this invention is that the connection features on the edging strip do not engage the central portion of the stake, and therefore, the central portion of the stake can be provided with barbs for preventing removal of the stake from the soil. The connecting structure on the edging strip for engaging the stake has a relatively low profile which does not significantly change, if at all, the overall thickness of the edging strip, such that the space needed for shipping and storage is not affected by the structure for connecting the edging strips to the anchor stakes. Also, the edging strip and stakes of the edging system of this invention are configured so that there is essentially no window or gap in the edging strip through which grass roots can grow. Further, the edging strip of this invention can be bent along its length to conform to various curved landscape borders without causing the connecting features to be displaced relative to the side of the edging strip, thus eliminating connections between the edging strip and the stakes which are either too tight or too loose.

The edging system of this invention includes a horizontally elongate edging strip having opposing sides, a tab projecting from a side of the edging strip, and a vertically elongate stake including at least one vertically extending edge portion. The tab includes a first portion which extends away from the side of the edging strip and a second portion which extends substantially in a longitudinal direction of the elongate edging strip in spaced relationship from a vertical plane generally defined by the side of the edging strip from which the tab projects. The vertically extending edge portion of the stake has a thickness approximately equal to the distance between the vertical plane generally defined by the side of the edging strip from which the tab projects and the portion of the tab which extends substantially in the longitudinal direction of the elongate edging strip. The opposing sides of the substantially flat lateral edge portion of the stake may be engaged by and retained between the side of the edging strip from which the tab projects and the portion of the tab which extends substantially in the longitudinal direction of the edging strip.

BRIEF DESCRIPTION OF THE DRAWINGS

FIG. 3 is a fragmentary transverse sectional view of the edging strip and anchor stake shown in FIG. 2;

FIG. 4 is a vertical section as viewed along lines IV—IV of FIG. 3; and

FIG. 5 is an exploded perspective view of an alternative embodiment of the edging system of this invention.

DESCRIPTION OF THE PREFERRED EMBODIMENT

Figure 1:
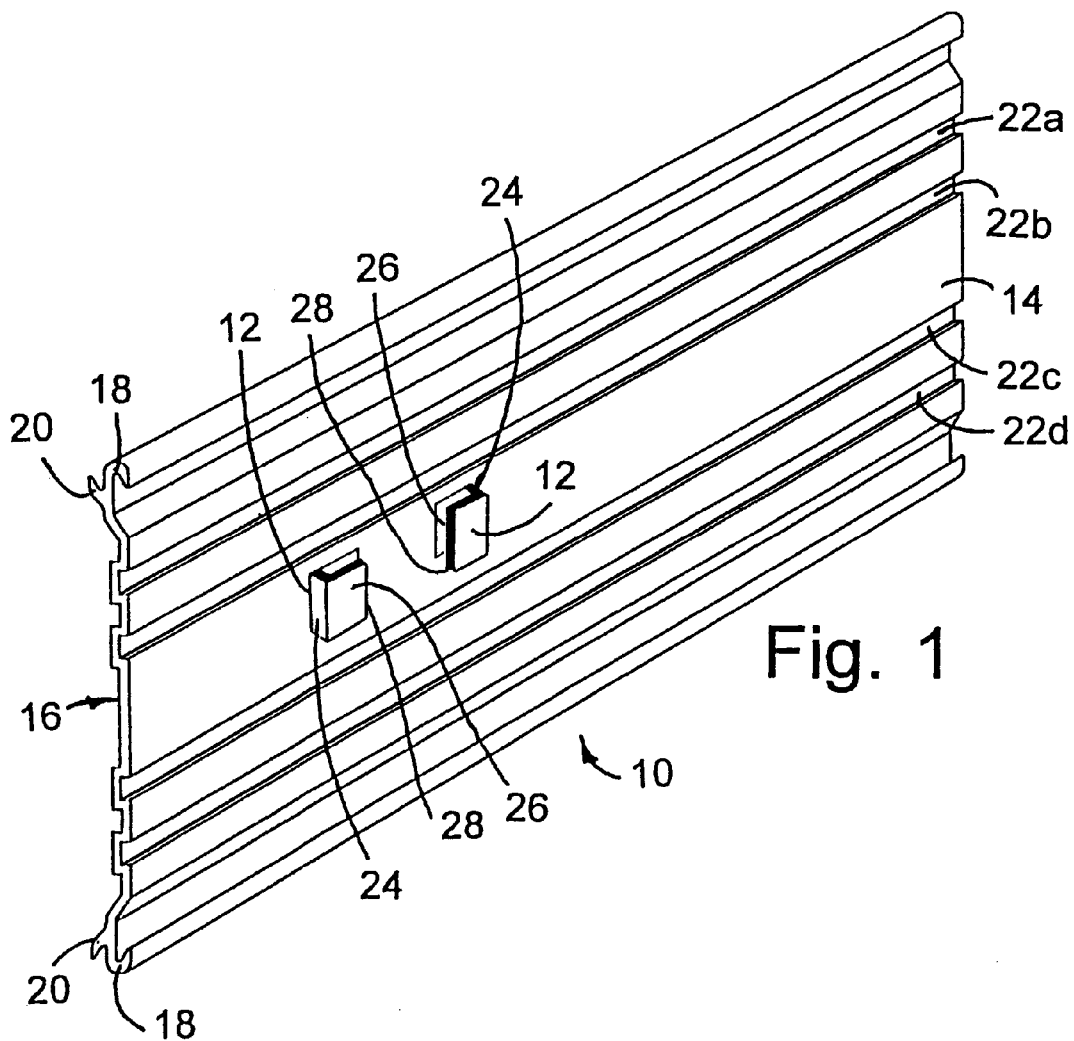
FIG. 1 is a perspective view of an edging strip in accordance with this invention.

In FIG. 1, there is shown a horizontally elongate edging strip 10 including a pair of tabs 12 which are configured to engage the edges of an anchor stake. Edging strip 10 includes a face or side 14 from which tabs 12 project and an opposing face or side 16. The illustrated edging strip 10 is the self-splicing type as disclosed in U.S. Pat. No. 5,020,272. Although self-splicing edging strips are preferred, other types of edging strips may also be used, the self-splicing features, including hooks 18 and ridges 20, being relatively unimportant and relatively unrelated to the novel features and advantages of the present invention. Side 14 of edging strip 10 includes a plurality of vertically spaced apart horizontally extending elongate grooves 22a, 22b, 22c, 22d which enhance the ability of the edging strip to grip the soil once installed in the ground. Each of the tabs 12 includes a first portion 24 which extends away from side 14 of edging strip 10, and a second portion 26 which extends substantially in a longitudinal direction of the elongate edging strip in spaced relationship from a vertical plane generally defined by the side 14 of the edging strip 10. Portions 26 of tabs 12 are located in a plane approximately parallel to the plane defined by side 14 of edging strip 10, and that the plane in which portions 26 are located is spaced away from the plane defined by side 14 of edging strip 10. The extent to which the location of portions 26 of tabs 12 may deviate from being in a plane parallel with the plane defined by side 14 is not susceptible to precise definition. However, the configuration and positioning of tabs 12 can be approximately defined in terms of their function. Generally, tabs 12 are configured to engage substantially flat, lateral edge portions of an anchor stake so that the edge portions of the stake are retained between side 14 of edging strip 10 and portions 26 of tabs 12. Tab 12 is somewhat resilient and may be slightly bowed so that the center of portion 26 of tab 12 is closer to wall 14 than the edges thereof. This allows tab 12 to accommodate and securely retain an edge portion of a stake 30, and allows minor variation (tolerances) in the thickness of the edge portion. A similar effect can be achieved by providing portion 26 of tab 12 with an embossment which projects toward wall 14.

In the illustrated embodiment, tabs 12 are punched out from the side of the elongate edging strip from which the tabs projects. Tabs 12 are bent outwardly from the vertical plane generally defined by side 14 of the edging strip 10 about a first axis that extends vertically, and the tabs are again bent toward an end of the edging strip about a second axis that extends vertically. Also in the illustrated embodiment, each of the portions 26 of tabs 12 extend integrally from portions 24 toward each other and terminate with a free end 28, i.e., an unconnected edge which is spaced away from wall 14. Also, each of tabs 12 shown in FIG. 1 are at the same elevation (approximately located at half the height of the edging strip 10). However, it should be understood that when two tabs 12 are used for engaging lateral edge portions of an anchor stake, the two tabs need not necessarily be located at the same elevation. Moreover, it is conceivable that a single tab may be used for securing an anchor stake to edging strip 10 without departing from the principles of this invention.

Figure 2:
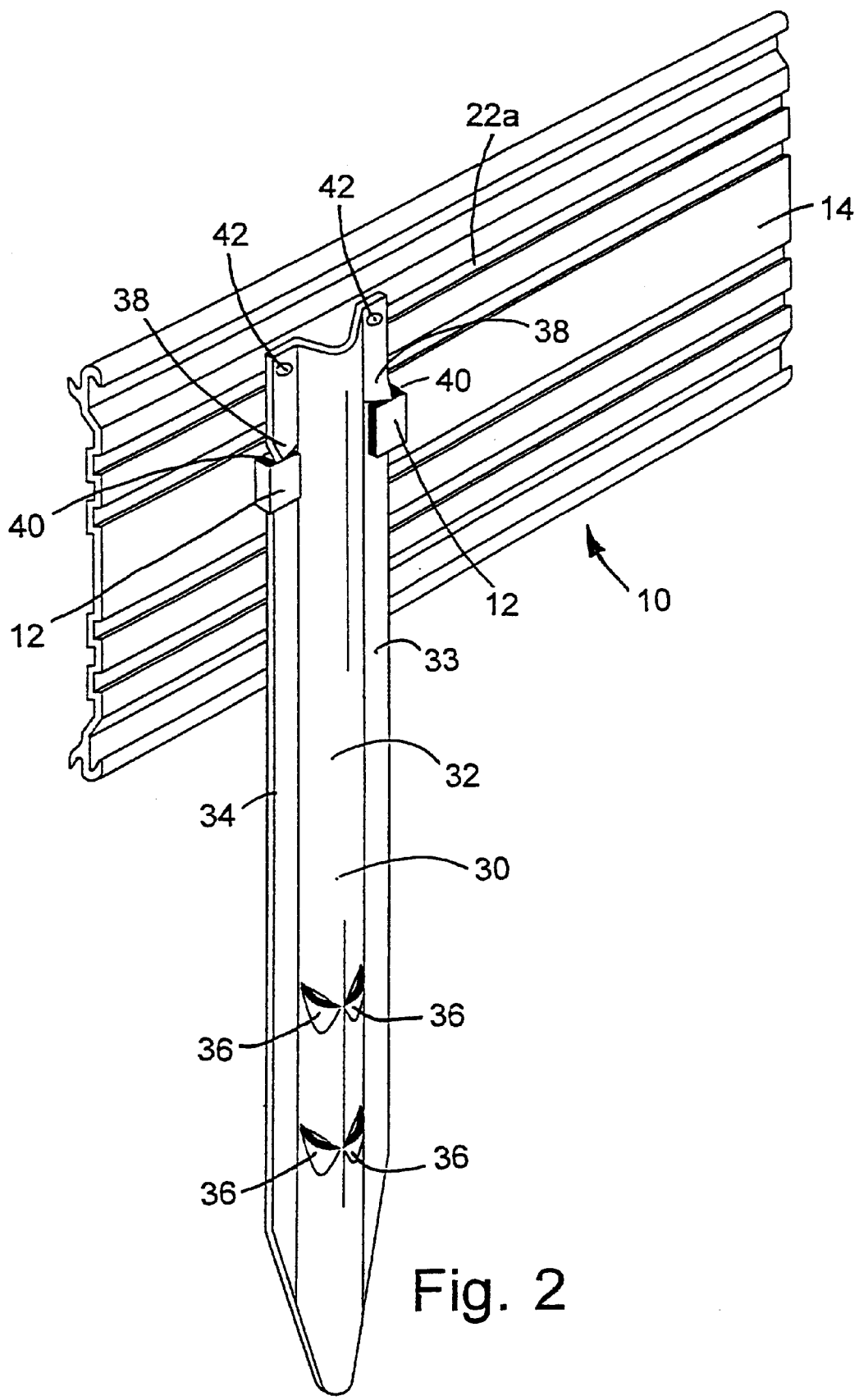
FIG. 2 is a perspective view of the edging strip shown in FIG. 1, with an anchor stake interlockingly connected thereto.

Edging strip 10 is shown in FIG. 2 with an anchor stake 30 secured on side 14 thereof by means of tabs 12. Anchor stake 30 includes a vertically extending, contoured central portion 32 and vertically extending lateral edge portions 33 and 34 defined on opposite sides of stake 30. Illustrated stake 30 includes edge portions 33 which extend vertically along substantially the entire length of stake 30. However, it should be understood that the vertically extending lateral edge portions 33 need not extend along the entire length of the stake, it only being necessary that the lateral edge portions have sufficient area to engage side 14 of edging strip 10 and portions 26 of tabs 12 so that the lateral edge portions are retained between side 14 of edging strip 10 and tabs 12. A plurality of barbs 36 are punched into the vertically extending central portion 32 of stake 30 to help retain the stake in the ground after installation of the edging system. Because securement of stake 30 is achieved by engagement of lateral edge portions 33, 34 with tabs 12 which project outwardly from side 14 of edging strip 10 and terminate with a free end, the vertically extending central portion 32 may be freely configured as desired, such as to optimize the strength, stiffness and rigidity of stake 30 while minimizing the material needed to form stake 30. Stops 38 are provided at an upper portion of stake 30 for engaging upper edges 40 of tabs 12 to limit downward movement of stake 30 when the stake is secured to the edging strip with lateral edge portions 33 and 34 retained between side 14 of edging strip 10 and tabs 12. Stops 38 are provided on stake 30 of the illustrated embodiment by cutting lateral edge portions 33 and 34 transversely to the longitudinal direction of the stake and by bending the portion above the cut forwardly (away from wall 14) and inwardly (toward central portion 32). Although the lower portions of vertically extending lateral edge portions 33 and 34 of stake 30 are free of any barbs or other projections, to allow the lower edges of lateral edge portions 33 and 34 to be slid downwardly through the space between side 14 of edging strip 10 and portions 26 of tabs 12 until the upper edges 40 of tabs 12 are engaged by stops 38, it is conceivable that the lower portions of lateral edge portions 33, 34 may be provided with barbs or other projections provided that portions of vertically extending lateral edge portions 33 and 34 are cut out between the portions thereof engaging tabs 12 and any barbs or other projections so that stake 30 can be secured to edging strip 10 by passing tabs 12 through gaps cut into lateral edge portions 33 and 34 and thereafter sliding the stake downwardly to allow engagement of the lateral edge portions 33, 34 with tabs 12.

As shown in FIG. 3, the illustrated stake 30 has a generally V-shaped central portion 32 and a pair of flat lateral edge portions 33, 34 which are retained between wall 14 and portions 26 of tabs 12 which extend substantially in the longitudinal direction of the elongate edging strip.

As shown in FIGS. 2 and 4, stake 30 is provided with projections 42 which extend into and engage groove 22a when the substantially flat lateral edge portions 33, 34 of stake 30 are engaged between the edging strip 10 and the tabs 12, whereby both upward and downward movement of the stake is restricted. Projections 42 are preferably embossments formed in a metal sheet form which stake 30 is made. Alternatively, projections 42 can be formed during molding of a plastic stake.

Edging strip 10 can be made of a variety of materials. Preferably, the edging strip 10 is an aluminum extrudate. However, it is conceivable that edging strip 10 can be made by forming metal sheet, or by extruding or molding plastic materials. Stake 30 is preferably formed of metal sheet, but may also be an aluminum extrudate, or may be made by molding or extruding plastic.

In FIG. 5, there is shown an alternative embodiment in accordance with the principles of this invention, wherein an edging strip 110 is provided with a single tab 112 for retaining an anchor stake 130. Edging strip 110 is substantially identical with the edging strip 10 previously described, except that it is provided with only one tab 112 for retaining stake 130, instead of two. Tab 112 may be identical to the previously described tab 12. Illustrated stake 130 has a substantially rectangular transverse cross-sectional shape defined by a front wall 150, side walls 151, 152, and a partial rear wall 153 integrally connected at one end to an end of side wall 151 and free at its other end to provide a gap between the free end of wall 153 and wall 152. This gap permits passage of outwardly extending portion 124 of tab 112. Wall 153 has a thickness which is approximately equal to the distance between the vertical plane generally defined by the side 114 of edging strip 110 and portion 126 of tab 112 which extends substantially in the longitudinal direction of the elongate edging strip. Wall 153 acts as an edge portion of stake 130 which may be engaged by and retained between the side of the edging strip 114 and portion 126 of tab 112. Interconnection of stake 130 with edging strip 110 is achieved by orienting stake 130 vertically with the pointed portion 160 pointed downwardly and with wall 153 generally aligned with the gap between wall 114 of edging strip 110 and portion 126 of tab 112, and thereafter pushing stake 130 downwardly so that wall 153 is inserted between wall 114 and tab portion 126. Stake 130 may be pushed downwardly until upper edge 165 of tab 112 is engaged by stop 170 projecting inwardly (toward wall 114 of edging strip 110) from front wall 150. Although front wall 150 of the illustrated stake 130 is flat, wall 150 may generally be contoured as desired and may be provided with barbs 180.

The above description is considered that of the preferred embodiment. Modifications of the invention will occur to those who make or use the invention. Therefore, it is understood that the embodiment shown in the drawings and described above is merely for illustrative purposes and is not intended to limit the scope of the invention, which is defined by the following claims.

The embodiments of the invention in which an exclusive property of privilege is claimed are defined as follows:

1. A landscape edging or paving restraint system comprising:
   a horizontally elongate edging strip having opposing sides;
   a tab projecting from a side of the edging strip, the tab including a first portion which extends away from the side of the edging strip and a second portion which extends substantially in a longitudinal direction of the elongate edging strip in spaced relationship from a vertical plane generally defined by the side of the edging strip from which the tab projects, the second portion of the tab terminating with a free end; and
   a vertically elongate stake having a pointed lower end and including a contoured portion which is configured to provide a high strength cross-sectional shape and at least one edge portion, the edge portion having a thickness approximately equal to a distance between the vertical plane generally defined by the side of the edging strip from which the tab projects and a portion of the tab which extends substantially in the longitudinal direction of the elongate edging strip, the tab engaging only the edge portion of the stake whereby the contoured portion of the stake may be configured as desired to provide a high strength cross-sectional shape without affecting the connection between the stake and the edging strip.

2. The landscape edging or paving restraint system of claim 1, wherein the tab is punched out from the side of the elongate edging strip from which the tab projects, the tab being bent outwardly from the vertical plane generally defined by the side of the edging strip from which the tab projects about a first axis that extends vertically, and the tab being bent toward an end of the edging strip about a second axis that extends vertically.

3. The landscape edging or paving restraint system of claim 1, wherein the stake includes a stop for engaging an upper edge of the tab to limit downward movement of the stake when the edge portion of the stake is engaged between the edging strip and the tab.

4. The landscape edging system or paving restraint system of claim 1, wherein the edging strip includes a longitudinal groove and the stake includes a projection which extends into and engages the groove when the edge portion of the stake is engaged between the edging strip and the tab, whereby both upward and downward movement of the stake is restricted.

5. A landscape edging or paving restraint system comprising:
   a horizontally elongate edging strip which can be bent along its length to conform to various curved landscape borders;
   a tab projecting from a side of the edging strip, the tab including a first portion extending away from the side of the edging strip and a second portion which extends away from the first portion of the tab in spaced relationship from the side of the edging strip to define a spacing between the second portion of the tab and the edging strip, the second portion of the tab terminating with a free end; and
   a vertically elongate stake having a pointed lower end and including a contoured portion which is configured to provide a high strength cross-sectional shape and at least one edge portion, the edge portion having a thickness approximately equal to a distance equal to the spacing between the second portion of the tab and the edging strip, the tab engaging only the edge portion of the stake whereby the contoured portion of the stake may be configured as desired to provide a high strength cross-sectional shape without affecting the connection between the stake and the edging strip: and the edging strip and stake being configured so that there is essentially no gap in the edging strip through which grass can grow.

6. The landscape edging or paving restraint system of claim 5, wherein the tab is punched out from the side of the elongate edging strip from which the tab projects, the tab being bent outwardly from the vertical plane generally defined by the side of the edging strip from which the tab projects about a first axis that extends vertically, and the tab being bent toward an end of the edging strip about a second axis that extends vertically.

7. The landscape edging or paving restraint system of claim 5, wherein the stake includes a stop for engaging an upper edge of the tab to limit downward movement of the stake when the edge portion of the stake is engaged between the edging strip and the tab.

8. The landscape edging system or paving restraint system of claim 5, wherein the edging strip includes a longitudinal groove and the stake includes a projection which extends into and engages the groove when the edge portion of the stake is engaged between the edging strip and the tab, whereby both upward and downward movement of the stake is restricted.

9. The landscape edging or paving restrain system of claim 5, wherein the edging strip is made of a metal.

10. The landscape edging or paving restrain system of claim 5, wherein the edging strip is made of plastic.

11. The landscape edging or paving restrain system of claim 5, wherein the edging strip is an aluminum extrudate.

* * * * *

UNITED STATES PATENT AND TRADEMARK OFFICE
CERTIFICATE OF CORRECTION

PATENT NO. : 5,941,018
DATED : August 24, 1999
INVENTOR : Robert T. Herrema

It is certified that error appears in the above-identified patent and that said Letters Patent is hereby corrected as shown below:

Column 1, Line 39;
Insert the following paragraph:
--In the case of extruded metal or plastic stakes, and in the case of molded plastic stakes, it is generally desirable to form one or more longitudinal stiffening ribs to make the stake more resistant to deformation.--

Column 4, Line 8;
"tabs projects" should be --tabs project--.

Column 8, Claims 9, 10 & 11, Line 1 of each Claim;
"restrain" should be --restraint--.

Signed and Sealed this

Twenty-fifth Day of April, 2000

Attest:

Q. TODD DICKINSON

Attesting Officer

Director of Patents and Trademarks